Jan. 21, 1941.　　　　F. KASPAR　　　　2,229,329
METHOD OF APPLYING SHIELDS TO ELECTRODES
Filed April 2, 1938
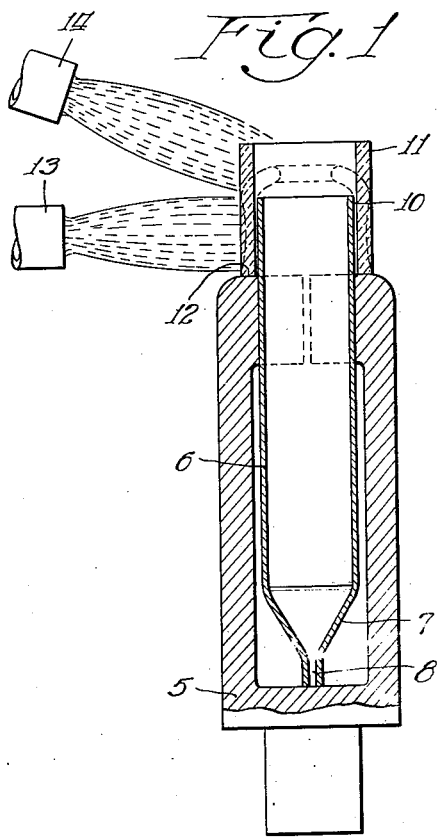
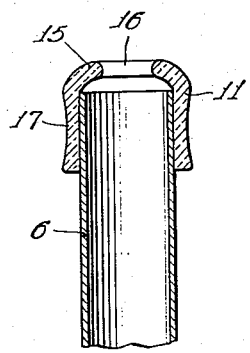
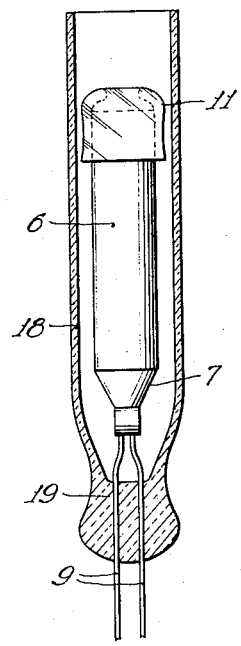
Inventor:
Frank Kaspar Patented Jan. 21, 1941

2,229,329

UNITED STATES PATENT OFFICE 2,229,329

METHOD OF APPLYING SHIELDS TO ELECTRODES

Frank Kaspar, Cicero, Ill., assignor to General Scientific Corporation, Chicago, Ill., a corporation of Illinois Application April 2, 1938, Serial No. 199,597

1 Claim. (Cl. 49—81)

The present invention relates to electrodes or gaseous conduction devices and has for its principal purpose a method of protecting the electrodes by applying thereto an insulating seal over the open end of a tubular electrode.

It has been proposed to seal electrodes by providing glass or other insulating sleeves around the electrode and at the end thereof. The present invention contemplates an improved method in the application of such seals and particularly to the application of a short seal over the open end of an electrode.

The features and advantages of the invention will appear more fully as the description proceeds in connection with the accompanying drawing wherein a preferred form of the invention is shown. It is to be understood, however, that the drawing and description are illustrative only and are not to be considered as limiting the invention except insofar as it is limited by the claim.

In the drawing,

Fig. 1 is a longitudinal sectional view through an electrode mandrel illustrating one step in the method;

Fig. 2 is a sectional view through a portion of an electrode showing the finished condition of the electrode and shield, and Fig. 3 illustrates the electrode finally mounted in a gaseous conduction tube.

Referring now to the drawing, there is illustrated in Fig. 1 a mandrel 5 which may be rotated by any suitable means and which is arranged to receive and hold an electrode 6 in position. The electrode 6 is a tubular metal seal having one end conical in form, as shown at 7, with an opening at 8 to receive a lead-in wire 9. The other end of the electrode is open, as shown at 10.

The present method is particularly concerned with the application of a protecting sleeve 11 to the open end 10 of the electrode. To accomplish this purpose I utilize a Pyrex glass sleeve 11, or its equivalent. The sleeve is sufficiently larger in diameter than the open end 10 of the electrode to readily fit down over it and rest upon the upper end 12 of the mandrel 5. With the sleeve in position as shown in Fig. 1 the mandrel is rotated and heat is applied by means of burners 13 and 14 directly against the outer surface of the sleeve 11 while the sleeve is rotating. The force of the flames from the burners 13 and 14 is utilized in shaping the sleeve and shrinking it onto the end of the electrode. As the glass softens, the force of the flame causes the upper end 15 of the sleeve 11 to be turned inward, producing a reduced aperture 16 in front of the electrode. Also, the force of the flame directed against the side of the electrode causes the softened glass to assume the shape indicated at 17, that is, a somewhat concave exterior shape on the part that overlaps the electrode. The force of the flame also causes the glass to shrink onto the electrode so as to form a sufficiently tight fit to hold the glass sleeve in place and prevent its removal while the electrode is being assembled. After the sleeve is applied in this fashion, the electrode can be mounted in a gaseous conduction tube 18 by sealing the lead-in wires 9 in the end of the tube 18, as illustrated at 19.

Having thus described my invention, what I claim as new and desire to secure by Letters Patent is:

A method of applying a shield to the open end of a tubular electrode which comprises fitting a glass sleeve slightly larger than the outer surface of the electrode in overlapping position over the open end of the electrode so that a portion of the sleeve projects beyond the electrode, applying heat to the overlapped portion of the sleeve and shrinking it upon the outer surface of the electrode, and directing a flame against the portion of the sleeve projecting beyond the electrode thereby bending the free end of the sleeve inward in a dome-like shape beyond the free end of the electrode and providing a restricted opening through the sleeve in spaced relation to the open end of the electrode.

FRANK KASPAR.